US012782614B2

(12) United States Patent
Kung et al.

(10) Patent No.: US 12,782,614 B2
(45) Date of Patent: Nov. 3, 2026

(54) DISPLAY PANEL

(71) Applicant: AUO Corporation, Hsin-Chu (TW)

(72) Inventors: Shu-Cheng Kung, Hsin-Chu (TW); Jia-Hong Wang, Hsin-Chu (TW); Ya-Ling Hsu, Hsin-Chu (TW); Chen-Hsien Liao, Hsin-Chu (TW)

(73) Assignee: AUO Corporation, Hsin-Chu (TW)

( * ) Notice: Subject to any disclaimer, the term of this patent is extended or adjusted under 35 U.S.C. 154(b) by 291 days.

(21) Appl. No.: 18/393,764

(22) Filed: Dec. 22, 2023

(65) Prior Publication Data

US 2025/0138225 A1 May 1, 2025

(30) Foreign Application Priority Data

Oct. 26, 2023 (TW) ................................. 112141119

(51) Int. Cl.
*G02B 5/02* (2006.01)
*G02F 1/1335* (2006.01)

(52) U.S. Cl.
CPC ......... *G02B 5/0294* (2013.01); *G02B 5/0221* (2013.01); *G02B 5/0278* (2013.01); *G02F 1/133502* (2013.01)

(58) Field of Classification Search
CPC .. G02B 5/0294; G02B 5/0221; G02B 5/0278; G02B 1/11; G02F 1/133502; G02F 1/133562; H10K 59/80; H10K 59/12; H01L 25/165; H01L 25/167; H10H 29/142
See application file for complete search history.

(56) References Cited

U.S. PATENT DOCUMENTS 8,416,381 B2 * 4/2013 Tochigi ................ G02B 5/0226 349/137
12,490,620 B2 * 12/2025 Choi ...................... H10K 59/12
2008/0158799 A1 * 7/2008 Tai ........................... H05K 5/02 361/728
2009/0079904 A1 * 3/2009 Yada ................ G02F 1/133308 349/60
2009/0109366 A1 * 4/2009 Lippey .............. G02F 1/133502 349/137
2010/0103641 A1 * 4/2010 Cho ..................... H10K 59/871 445/24

(Continued)

FOREIGN PATENT DOCUMENTS

TW 201139140 A 11/2011
TW 202243288 A 11/2022

(Continued)

*Primary Examiner* — Bumsuk Won
*Assistant Examiner* — John C Sipes
(74) *Attorney, Agent, or Firm* — WPAT, PC

(57) ABSTRACT

A display panel includes a display module and an anti-glare layer. The display module has a pixel density PPI, and the display module includes an upper substrate. The anti-glare layer is over the display module. A top surface of the anti-glare layer has a plurality of microstructures, and the microstructures have a root mean square slope RΔq. A thickness L from a bottom of the upper substrate of the display module to a top of the anti-glare layer complies with a following relational expression:

$$L > \frac{0.001 * PPI}{R\Delta q}.$$

16 Claims, 4 Drawing Sheets

100

(56) References Cited

U.S. PATENT DOCUMENTS

| | | | | |
|---|---|---|---|---|
| 2010/0149646 | A1* | 6/2010 | Kim | G02B 5/20 359/601 |
| 2012/0002282 | A1 | 1/2012 | Nagahama et al. | |
| 2012/0008206 | A1 | 1/2012 | Haga et al. | |
| 2016/0195642 | A1* | 7/2016 | Eguchi | G02B 5/0294 359/601 |
| 2017/0003429 | A1* | 1/2017 | Kanatani | G02B 5/3083 |
| 2017/0329066 | A1* | 11/2017 | Harada | G02B 5/0294 |
| 2019/0054672 | A1* | 2/2019 | Kajihara | B32B 15/20 |
| 2019/0119151 | A1* | 4/2019 | Kim | C03C 17/30 |
| 2021/0214270 | A1* | 7/2021 | Shimizu | C03C 3/087 |
| 2021/0396912 | A1 | 12/2021 | Yan | |
| 2022/0310728 | A1* | 9/2022 | Bae | H10K 59/122 |
| 2023/0086813 | A1* | 3/2023 | Ying | G02B 1/111 428/172 |
| 2023/0092571 | A1* | 3/2023 | Ying | G02B 5/0226 359/601 |
| 2023/0221465 | A1 | 7/2023 | Kung | |
| 2023/0359074 | A1* | 11/2023 | Amin | G02F 1/19 |
| 2024/0243140 | A1* | 7/2024 | Yin | H10D 86/60 |
| 2025/0102851 | A1* | 3/2025 | Ma | G02F 1/1334 |

FOREIGN PATENT DOCUMENTS

| | | | |
|---|---|---|---|
| TW | 202308840 | A | 3/2023 |
| TW | 202328707 | A | 7/2023 |
| TW | 202336464 | A | 9/2023 |

* cited by examiner

DISPLAY PANEL

CROSS-REFERENCE TO RELATED APPLICATION

This application claims priority to Taiwan Application Serial Number 112141119, filed Oct. 26, 2023, which is herein incorporated by reference.

BACKGROUND

Field of Invention

The present disclosure relates to a display panel.

Description of Related Art

As the display manufacturing process progresses day by day, many technologies have been applied to the displays to enhance the users' viewing experience when using the displays. For example, optical films having different functions can be placed on the surfaces of the displays to improve the users' viewing experience when using the displays. One of the optical films is the anti-glare layer. The anti-glare layer can reduce glare caused by reflection from the display module. Using a display with an anti-glare layer can reduce user discomfort when using the display. However, the anti-glare layer may cause the problem of sparkles, which can also affect the user's viewing experience. As a result, it is necessary to reduce the problem of sparkles that may be caused by the anti-glare layer.

SUMMARY

Some embodiments of the present disclosure provide a display panel. The display panel includes a display module and an anti-glare layer. The display module has a pixel density PPI (pixels per inch), and the display module includes an upper substrate. The anti-glare layer is over the display module. A top surface of the anti-glare layer has a plurality of microstructures, and the microstructures have a root mean square slope RΔq. A thickness L from a bottom of the upper substrate of the display module to a top of the anti-glare layer complies with the following relational expression:

$$L > \frac{0.001 * PPI}{R\Delta q}.$$

In the foregoing, the anti-glare layer includes a single material.

In the foregoing, the anti-glare layer is free of scattering particles.

In the foregoing, the anti-glare layer has an internal haze of zero.

In the foregoing, a surface haze of the anti-glare layer is greater than an internal haze of the anti-glare layer.

In the foregoing, the upper substrate is a filter layer substrate.

In the foregoing, the display module further includes a backlight module, a substrate over the backlight module, a liquid crystal layer over the substrate and under the upper substrate, a polarizer over the upper substrate, and an adhesive layer over the polarizer.

In the foregoing, the display module further includes a substrate, a light-emitting layer over the substrate and under the upper substrate, and an adhesive layer over the upper substrate.

In the foregoing, the upper substrate is a transparent substrate.

In the foregoing, when a surface haze of the anti-glare layer is 59%, the root mean square slope RΔq is greater than 0.1 and less than 0.15.

In the foregoing, when a surface haze of the anti-glare layer is 65%, the root mean square slope RΔq is not less than 0.15.

Some embodiments of the present disclosure provide a display panel. The display panel includes a display module and an anti-glare layer. The display module has a pixel density PPI, and the display module includes a substrate and a plurality of light-emitting components. The light-emitting components are on the substrate. The anti-glare layer is over the display module. A top surface of the anti-glare layer has a plurality of microstructures, and the microstructures have a root mean square slope RΔq. A thickness L from tops of the light-emitting components of the display module to a top of the anti-glare layer complies with the following relational expression:

$$L > \frac{0.001 * PPI}{R\Delta q}.$$

In the foregoing, the anti-glare layer includes a single material.

In the foregoing, the anti-glare layer has an internal haze of zero.

In the foregoing, a surface haze of the anti-glare layer is greater than an internal haze of the anti-glare layer.

In the foregoing, the display module further includes an encapsulation layer. The encapsulation layer is over the light-emitting components and contacts the light-emitting components.

In the foregoing, the display module further includes an adhesive layer over the encapsulation layer and under the anti-glare layer.

In the foregoing, when a surface haze of the anti-glare layer is 35%, the root mean square slope RΔq is greater than 0.07 and less than 0.1.

In the foregoing, when a surface haze of the anti-glare layer is 59%, the root mean square slope RΔq is greater than 0.1 and less than 0.15.

In the foregoing, when a surface haze of the anti-glare layer is 65%, the root mean square slope RΔq is not less than 0.15.

The anti-glare layer according to some embodiments of the present disclosure has no internal haze and has sufficient thickness. Therefore, the anti-glare layer can be designed to have no internal haze and not to generate sparkles. As a result, the definition of image displayed on the display panel can be improved.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

DESCRIPTION OF THE EMBODIMENTS

Figure 1:
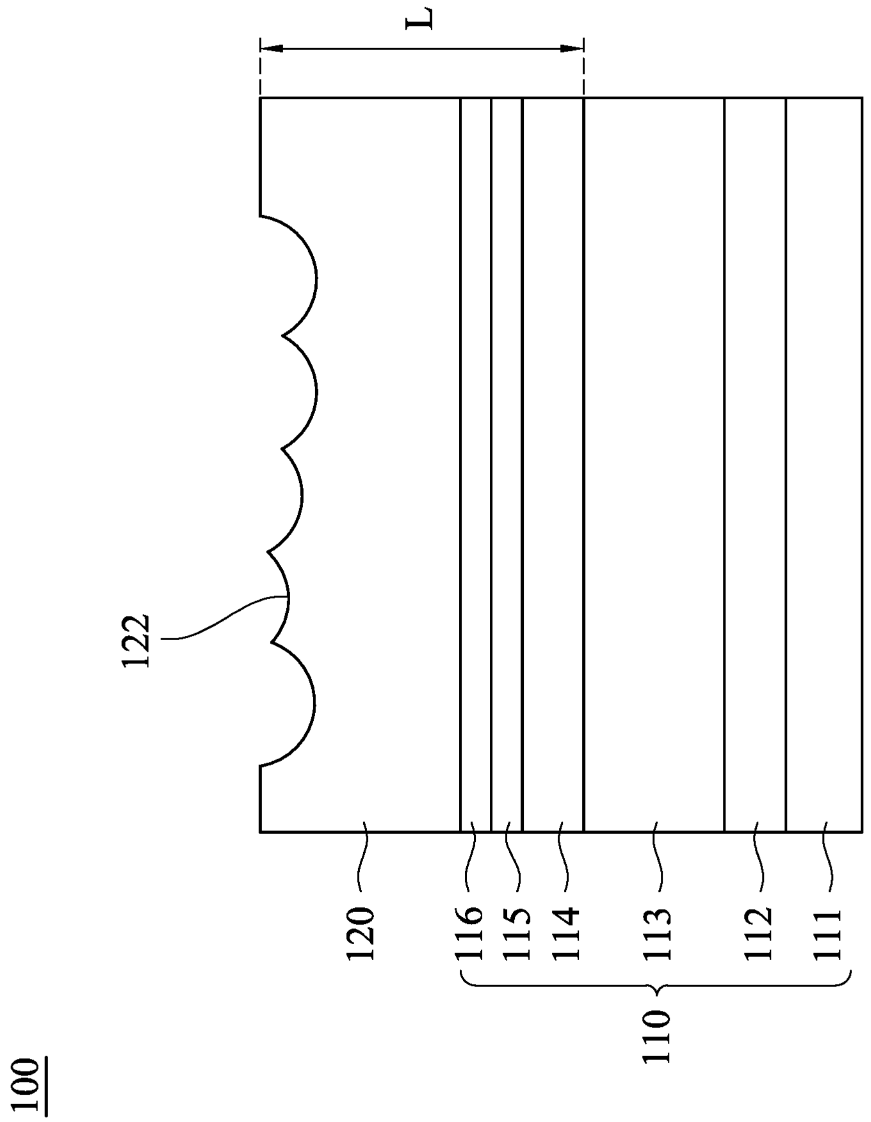
FIG. 1 depicts a cross-sectional view of a display panel according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

Some embodiments of the present disclosure relate to an anti-glare layer of a display panel. The anti-glare layer according to some embodiments of the present disclosure has no internal haze and has sufficient thickness. Therefore, the anti-glare layer can be designed to have no internal haze and not to generate sparkles. As a result, the clarity of image displayed on the display panel can be improved.

FIG. 1 depicts a cross-sectional view of a display panel 100 according to some embodiments of the present disclosure. The display panel 100 may be a liquid crystal display. The display panel 100 includes a display module 110 and an anti-glare layer 120. The display module 110 has a pixel density PPI, and the display module 110 includes a backlight module 111, a substrate 112, a liquid crystal layer 113, an upper substrate 114, a polarizer 115, and an adhesive layer 116. The anti-glare layer 120 is over the display module 110.

The backlight module 111 can serve as a light source of the display panel 100. In greater detail, the backlight module 111 may include a reflective sheet, a light source, a light guide plate, a diffuser, and a prism sheet or some other components. The light guide plate can guide light emitted by the light source to a desired direction, for example, a direction towards the substrate 112. The diffuser can be used to make the light distribution more even. The prism sheet can be used to make directions of the emitted light consistent to increase the brightness of the backlight module 111. The reflective sheet can be used to prevent the light emitted by the light source from leaking out to increase the light use efficiency.

The substrate 112 is over the backlight module 111. The substrate 112 may be a substrate including a plurality of active components. For example, the substrate 112 may include an array constituted by thin film transistors (TFTs).

The liquid crystal layer 113 is over the substrate 112. The degrees of rotation and twisting of the liquid crystals in the liquid crystal layer 113 can be controlled by using an electrode layer (not shown in the figure, which can be located between the liquid crystal layer 113 and the substrate 112, or between the liquid crystal layer 113 and the upper substrate 114) so as to control the polarity of the liquid crystals. Then, the polarity of the liquid crystals can determine whether the light emitted by the backlight module 111 can pass through a polarizer (such as the polarizer 115) above the liquid crystal layer 113 and a polarizer (not shown in the figure, which can be located between the substrate 112 and the backlight module 111) below the liquid crystal layer 113 or not. In this manner, the brightness of different pixels of the display panel 100 is determined. In some embodiments, the electrode layer can be driven by active devices on the substrate 112.

The upper substrate 114 is over the liquid crystal layer 113. In some embodiments, the upper substrate 114 may be a filter layer substrate, and filter layers may be located on a surface of the upper substrate 114 facing the liquid crystal layer 113. The upper substrate 114 may include a pixel array constituted by filter layers of different colors. For example, each of the pixels may include a red filter layer, a green filter layer, and a blue filter layer to filter out red light, green light, and blue light. Controlling brightness of the red light, the green light, and the blue light can allow each of the pixels to emit color lights of different colors. The pixel density PPI of the display panel 100 can be defined by using a density of the pixel array of the upper substrate 114. For example, the pixel density PPI of the display panel 100 can be defined as a number of pixels per inch, and each of the pixels includes a red filter layer, a green filter layer, and a blue filter layer.

The polarizer 115 is over the upper substrate 114. The polarizer 115 can cooperate with a polarization direction of light passing through the liquid crystal layer 113 to determine whether the light can pass through the polarizer 115 or not. The adhesive layer 116 is over the polarizer 115 so as to be configured to adhere the anti-glare layer 120 to the polarizer 115.

The anti-glare layer 120 is over the display module 110. A top surface of the anti-glare layer 120 has a plurality of microstructures 122, and the microstructures 122 have a root mean square slope RΔq. A thickness L from a bottom of the upper substrate 114 of the display module 110 to a top of the anti-glare layer 120 complies with the following relational expression:

$$L > \frac{0.001 * PPI}{R\Delta q}.$$

In the above relational expression, the unit of the thickness L is millimeter (mm). In some embodiments, the thickness L can be regarded as a vertical distance traveled by the color lights. In the display panel 100, the thickness L is the vertical distance that the color lights travel in the display panel 100 after the light reaches the filter layers of the upper substrate 114 and is converted into the color lights.

In some embodiments, although FIG. 1 depicts the polarizer 115 and the adhesive layer 116 between the upper substrate 114 and the anti-glare layer 120, there may still be some other layer(s) between the upper substrate 114 and the anti-glare layer 120, for example, an adhesive layer between the upper substrate 114 and the polarizer 115. When there are more or less layers between the upper substrate 114 and the anti-glare layer 120, the thickness L is still defined as the thickness from the bottom of the upper substrate 114 of the display module 110 to the top of the anti-glare layer 120.

Figure 2:
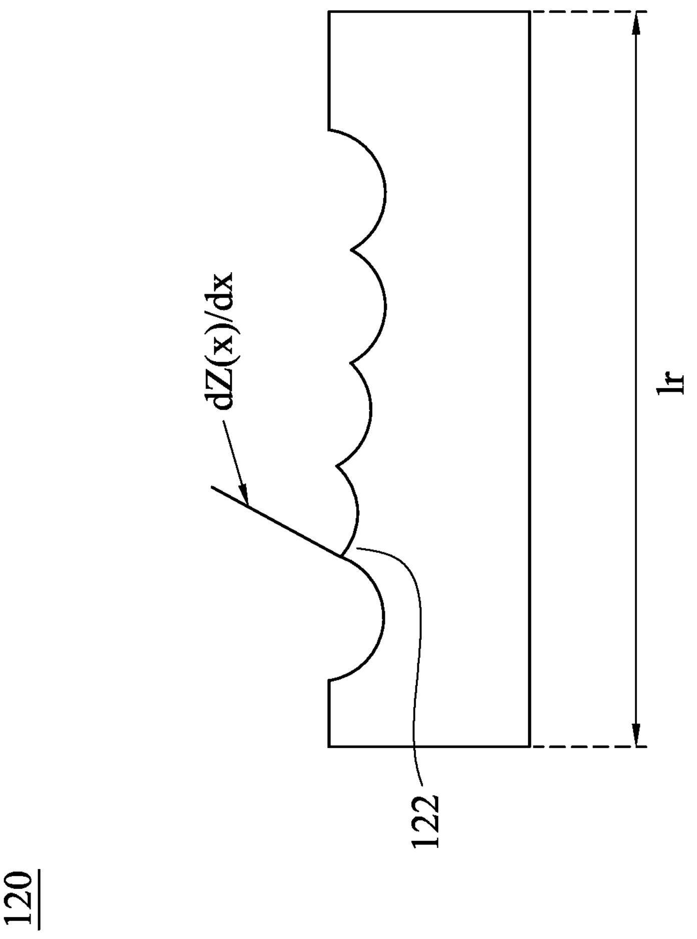
FIG. 2 depicts a schematic diagram of the anti-glare layer in FIG. 1.

FIG. 2 depicts a schematic diagram of the anti-glare layer in FIG. 1. The top surface of the anti-glare layer 120 has the plurality of microstructures 122, and a size of the microstructures 122 can be defined by suitable parameters, such as root mean square slope. The root mean square slope of the microstructures 122 can be calculated according to the definition of ISO 4287-1997. Take an upper surface of the anti-glare layer 120 for example, each location of the upper surface has a slope dZ(x)/dx. The root mean square slope RΔq of the microstructure 122 within a basic length lr can be calculated according to the following formula:

$$R\Delta q = \sqrt{\frac{1}{lr}\int_0^{lr}\left[\frac{dz(x)}{dx}\right]^2 dx}.$$

With additional reference to FIG. 1. When the thickness L from the bottom of the upper substrate 114 to the top of the anti-glare layer 120 of the display panel 100 complies with the following relational expression:

$$L > \frac{0.001 * PPI}{R\Delta q},$$

the anti-glare layer 120 does not cause sparkles under the circumstance that the anti-glare layer 120 has no internal haze or almost no internal haze. The sparkles can be the drop-shaped uneven brightness and chromaticity caused by using the anti-glare layer. The term "haze" herein is the percentage of the transmitted light intensity that deviates from the incident light at an angle of more than 2.5 degrees to the total transmitted light intensity. The total haze of a material is the sum of internal haze and surface haze. The internal haze is contributed by the interior of the material, and the surface haze is contributed by the surface of the material. Generally speaking, the value of the internal haze can depend on the number of scattering particles doped into the material. The value of the surface haze can depend on the shape of the microstructures on the surface of the material. Therefore, that the anti-glare layer 120 according to some embodiments of the present disclosure has no internal haze or almost no internal haze indicates that the anti-glare layer 120 is not doped with scattering particles. In other words, the anti-glare layer 120 includes a single material. In some embodiments, the anti-glare layer 120 is made of glass, transparent resin, or the like. In some embodiments, the anti-glare layer 120 has an internal haze of zero. Since the surface of the anti-glare layer 120 has the microstructures 122, the anti-glare layer 120 has a surface haze. In other words, the surface haze of the anti-glare layer 120 is greater than the internal haze of the anti-glare layer 120. There is a strong correlation between the surface haze of the anti-glare layer 120 and the root mean square slope RΔq. In some embodiments, when the surface haze of the anti-glare layer 120 is 35%, the root mean square slope RΔq is greater than 0.07 and less than 0.1. When the surface haze of the anti-glare layer 120 is 59%, the root mean square slope RΔq is greater than 0.1 and less than 0.15. When the surface haze of the anti-glare layer 120 is 65%, the root mean square slope RΔq is not less than 0.15.

When the thickness L from the bottom of the upper substrate 114 to the top of the anti-glare layer 120 complies with the above-mentioned relational expression, the anti-glare layer 120 itself without the internal haze can be made thicker without causing sparkles. The high thickness L from the bottom of the upper substrate 114 to the top of the anti-glare layer 120 can be used to protect the display panel 100 to prevent the display panel 100 from being damaged due to impact. The anti-glare layer 120 without the internal haze can improve the clarity of image displayed under the circumstance of high thickness L.

Figure 3:
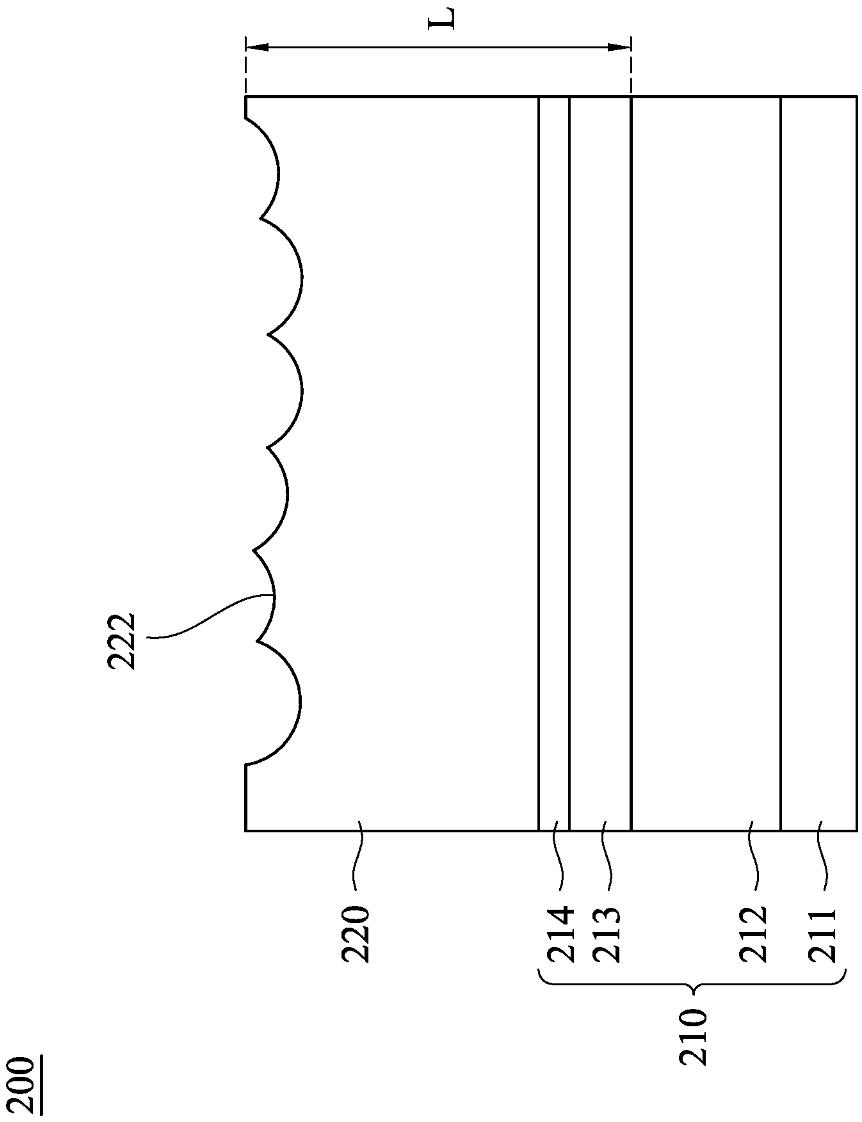
FIG. 3 depicts a cross-sectional view of a display panel according to some embodiments of the present disclosure.

FIG. 3 depicts a cross-sectional view of a display panel 200 according to some embodiments of the present disclosure. The display panel 200 may be an organic light-emitting diode display. The display panel 200 includes a display module 210 and an anti-glare layer 220. The display module 210 has a pixel density PPI, and the display module 210 includes a substrate 211, a light-emitting layer 212, an upper substrate 213, and an adhesive layer 214. The anti-glare layer 220 is over the display module 210.

The substrate 211 may be a substrate including a plurality of active devices. For example, the substrate 211 may include an array constituted by thin film transistors (TFTs).

The light-emitting layer 212 is over the substrate 211. The light-emitting layer 212 may include a pixel array constituted by light-emitting layers of different colors. For example, each of pixels may include a red light-emitting layer, a green light-emitting layer, and a blue light-emitting layer, and red light, green light, and blue light are respectively emitted by using a voltage difference generated by electrodes above and below the light-emitting layer 212. Controlling brightness of the red light, the green light, and the blue light can allow each of the pixels to emit color lights of different colors. The pixel density PPI of the display panel 200 can be defined by using a density of the pixel array of the light-emitting layer 212. For example, the pixel density PPI of the display panel 200 can be defined as a number of pixels per inch, and each of the pixels includes a red light-emitting layer, a green light-emitting layer, and a blue light-emitting layer. In some embodiments, an electrode layer (not shown in the figure) below the light-emitting layer 212 can be controlled by the active devices on the substrate 211.

The upper substrate 213 is over the light-emitting layer 212. The upper substrate 213 may be a transparent substrate to protect internal devices of the display panel 200. In some embodiments, there may be a filter layer between the upper substrate 213 and the light-emitting layer 212.

The adhesive layer 214 is over the upper substrate 213 so as to be configured to adhere the anti-glare layer 220 to the upper substrate 213.

The anti-glare layer 220 is over the display module 210. A top surface of the anti-glare layer 220 has a plurality of microstructures 222, and the microstructures 222 have a root mean square slope RΔq. A thickness L from a bottom of the upper substrate 213 of the display module 210 to a top of the anti-glare layer 220 complies with the following relational expression:

$$L > \frac{0.001 * PPI}{R\Delta q}.$$

In the above relational expression, the unit of the thickness L is millimeter (mm). In some embodiments, the thickness L can be regarded as a vertical distance traveled by the color lights. In the display panel 200, the thickness L is the vertical distance traveled by the color lights emitted from the light-emitting layer 212 in the display panel 200. Since a distance between a top of the light-emitting layer 212 and the bottom of the upper substrate 213 is much smaller than a thickness of the upper substrate 213 itself, the thickness L can be simplified to be the thickness from the bottom of the upper substrate 213 to the top of the anti-glare layer 220. Since relevant details of the anti-glare layer 220 are similar to or the same as the anti-glare layer 120 in FIG. 2, a description in this regard is not provided here.

In some embodiments, although FIG. 3 depicts the adhesive layer 214 between the upper substrate 213 and the anti-glare layer 220, there may still be some other layer(s)

between the upper substrate 213 and the anti-glare layer 220, for example, a polarizer or another adhesive layer. There may not be the adhesive layer 214 between the upper substrate 213 and the anti-glare layer 220. When there are more or less layers between the upper substrate 213 and the anti-glare layer 220, the thickness L is still defined as the thickness from the bottom of the upper substrate 213 of the display module 210 to the top of the anti-glare layer 220.

When the thickness L from the bottom of the upper substrate 213 to the top of the anti-glare layer 220 complies with the above-mentioned relational expression, the anti-glare layer 220 itself without an internal haze can be made thicker without causing sparkles. The high thickness L from the bottom of the upper substrate 213 to the top of the anti-glare layer 220 can be used to protect the display panel 200 to prevent the display panel 200 from being damaged due to impact. The anti-glare layer 220 without the internal haze can improve the definition of image displayed under the circumstance of high thickness L.

Figure 4:
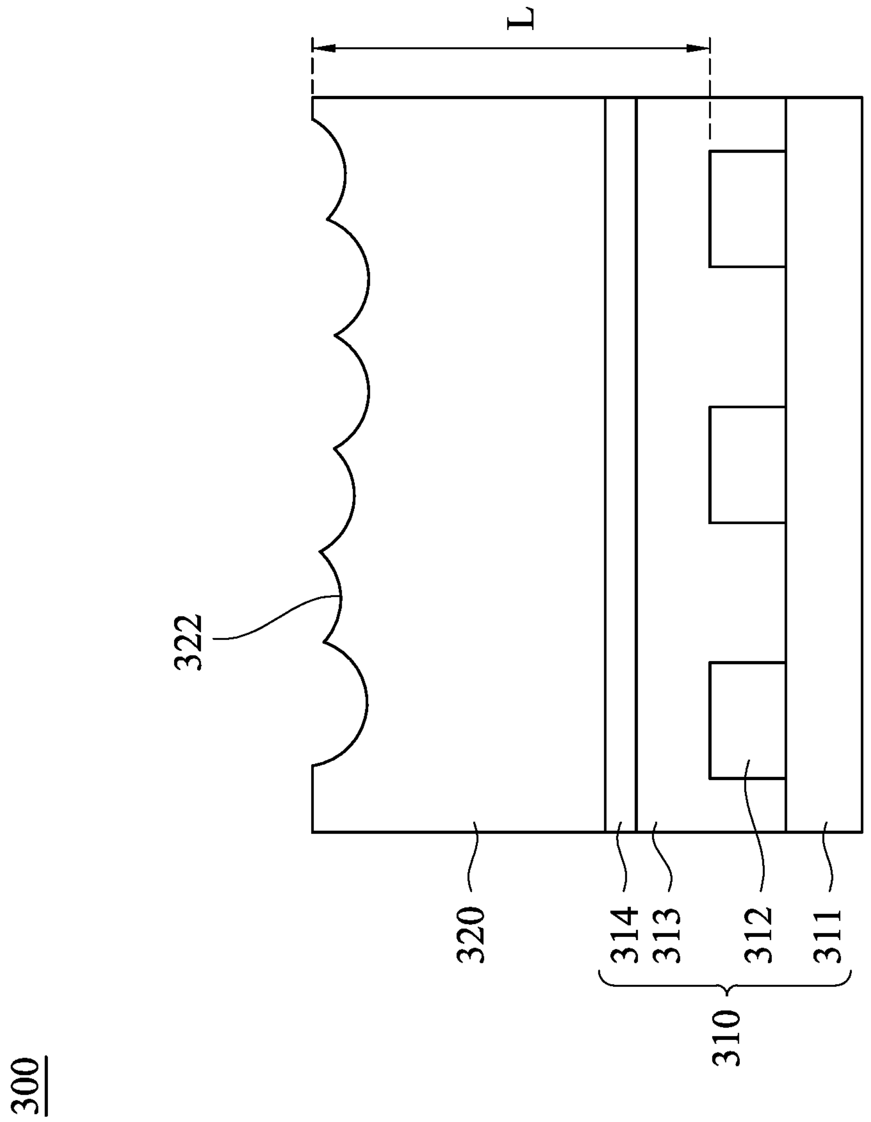
FIG. 4 depicts a cross-sectional view of a display panel according to some embodiments of the present disclosure.

FIG. 4 depicts a cross-sectional view of a display panel 300 according to some embodiments of the present disclosure. The display panel 300 may be a micro light-emitting diode display. The display panel 300 includes a display module 310 and an anti-glare layer 320. The display module 310 has a pixel density PPI, and the display module 310 includes a substrate 311, a plurality of light-emitting components 312, an encapsulation layer 313, and an adhesive layer 314. The anti-glare layer 320 is over the display module 310.

The substrate 311 may be a substrate including a plurality of active components. For example, the substrate 311 may include an array constituted by thin film transistors (TFTs).

The light-emitting components 312 are on the substrate 311. The light-emitting components 312 that can emit different colors can constitute a pixel array. For example, each of pixels may include a red light-emitting component, a green light-emitting component, and a blue light-emitting component. Controlling brightness of red light, green light, and blue light can allow each of the pixels to emit color lights of different colors. The pixel density PPI of the display panel 300 can be defined by using a density of the pixel array constituted by the light-emitting components 312. For example, the pixel density PPI of the display panel 300 can be defined as a number of pixels per inch, and each of the pixels includes a red light-emitting component, a green light-emitting component, and a blue light-emitting component. In some embodiments, each of the light-emitting components 312 may be a micro light-emitting diode.

The encapsulation layer 313 is over the light-emitting components 312 and contacts the light-emitting components 312. The encapsulation layer 313 can completely cover the light-emitting components 312 to protect the light-emitting components 312. In some embodiments, the encapsulation layer 313 may be silicone, epoxy resin, or the like.

The adhesive layer 314 is over the encapsulation layer 313 so as to be configured to adhere the anti-glare layer 320 to the encapsulation layer 313.

The anti-glare layer 320 is over the display module 310. A top surface of the anti-glare layer 320 has a plurality of microstructures 322, and the microstructures 322 have a root mean square slope RΔq. A thickness L from tops of the light-emitting components 312 of the display module 310 to a top of the anti-glare layer 320 complies with the following relational expression:

$$L > \frac{0.001 * PPI}{R\Delta q}.$$

In the above relational expression, the unit of the thickness L is millimeter (mm). Since relevant details of the anti-glare layer 320 are similar to or the same as the anti-glare layer 120 in FIG. 2, a description in this regard is not provided here. In some embodiments, the thickness L can be regarded as a vertical distance traveled by the color lights. In the display panel 300, the thickness L is the vertical distance traveled by the color lights emitted from the light-emitting components 312 in the display panel 300. Since the display panel 300 does not include an upper substrate, a distance between the tops of the light-emitting components 312 and a top of the encapsulation layer 313 still needs to be considered. Since relevant details of the anti-glare layer 320 are similar to or the same as the anti-glare layer 120 in FIG. 2, a description in this regard is not provided here.

In some embodiments, although FIG. 4 depicts the adhesive layer 314 between the encapsulation layer 313 and the anti-glare layer 320, there may still be some other layer(s) between the encapsulation layer 313 and the anti-glare layer 320, for example, a polarizer or another adhesive layer. There may not be the adhesive layer 314 between the encapsulation layer 313 and the anti-glare layer 320. When there are more or less layers between the encapsulation layer 313 and the anti-glare layer 320, the thickness L is still defined as the thickness from the tops of the light-emitting components 312 of the display module 310 to the top of the anti-glare layer 320.

When the thickness L from the tops of the light-emitting components 312 to the top of the anti-glare layer 320 complies with the above-mentioned relational expression, the anti-glare layer 320 itself without an internal haze can be made thicker without causing sparkles. The high thickness L from the tops of the light-emitting components 312 to the top of the anti-glare layer 320 can be used to protect the display panel 300 to prevent the display panel 300 from being damaged due to impact. The anti-glare layer 320 without the internal haze can improve the definition of image displayed under the circumstance of high thickness L.

Table 1 provides the sparkle reduction effect measured on a display panel with a pixel density of 160 PPI under the circumstances that the anti-glare layer without internal haze has different root mean square slopes RΔq and thicknesses L (the thickness L here can be the thickness L defined in FIG. 1, FIG. 3, or FIG. 4).

TABLE 1

| RΔq = 0.08 | | | | | | | |
|---|---|---|---|---|---|---|---|
| L (mm) | 0.8 | 1.1 | 1.6 | 2 | 2.3 | 2.7 | 3.2 |
| Sparkle (%) | 4.3 | 3.9 | 3.2 | 2.8 | 2.3 | 2.1 | 1.6 |
| RΔq = 0.12 | | | | | | | |
| L (mm) | 0.8 | 1.1 | 1.6 | 2 | 2.3 | 2.7 | 3.2 |
| Sparkle (%) | 2.8 | 2.5 | 2.2 | 1.7 | 1.4 | — | — |

The sparkle values in Table 1 can be obtained by dividing the standard deviation of the gray levels of the filtered image by the average value of the gray levels of the filtered image, and can be expressed as a percentage. As a rule of thumb, when the sparkle value does not exceed 2.3%, the human eye will not be able to sense the sparkles generated by the display panel. According to Table 1, when the root mean square slope RΔq is 0.08, the sparkle value does not exceed 2.3% under the circumstance that the thickness L is 2.3 mm or more. When the root mean square slope RΔq is 0.12, the sparkle value does not exceed 2.3% under the circumstance that the thickness L is 1.6 mm or more. The above thicknesses L with the sparkle value not exceeding 2.3% all comply with the relational expression as mentioned previously. As a result, the anti-glare layer itself without the internal haze according to some embodiments of the present disclosure can be made thicker without causing sparkles. The high thickness L can be used to protect the display panel to prevent the display panel from being damaged due to impact. The anti-glare layer without the internal haze can improve the definition of image displayed under the circumstance of high thickness L.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure covers modifications and variations of this disclosure provided they fall within the scope of the following claims and their equivalents.

What is claimed is:

1. A display panel comprising:
- a display module, the display module having a pixel density PPI, and the display module comprising an upper substrate; and
- an anti-glare layer over the display module, a top surface of the anti-glare layer having a plurality of microstructures, and the microstructures having a root mean square slope RΔq, wherein a surface haze of the anti-glare layer is 59%, the root mean square slope RΔq is greater than 0.1 and less than 0.15, and a thickness L measured in millimeters (mm) from a bottom of the upper substrate of the display module to a top of the anti-glare layer complies with the following relational expression:

$$L > \frac{0.001 * PPI}{R\Delta q}.$$

2. The display panel of claim 1, wherein the anti-glare layer comprises a single material.

3. The display panel of claim 1, wherein the anti-glare layer is free of scattering particles.

4. The display panel of claim 1, wherein the anti-glare layer has an internal haze of zero.

5. The display panel of claim 1, wherein a surface haze of the anti-glare layer is greater than an internal haze of the anti-glare layer.

6. The display panel of claim 1, wherein the upper substrate is a filter layer substrate.

7. The display panel of claim 6, wherein the display module further comprises:
- a backlight module;
- a substrate over the backlight module;
- a liquid crystal layer over the substrate and under the upper substrate;
- a polarizer over the upper substrate; and
- an adhesive layer over the polarizer.

8. The display panel of claim 1, wherein the display module further comprises:
- a substrate;
- a light-emitting layer over the substrate and under the upper substrate; and
- an adhesive layer over the upper substrate.

9. The display panel of claim 8, wherein the upper substrate is a transparent substrate.

10. A display panel comprising:
- a display module, the display module having a pixel density PPI, and the display module comprising an upper substrate; and
- an anti-glare display module, a top surface of the anti-glare layer having a plurality of microstructures, and the microstructures having a root mean square slope RΔq, wherein when a surface haze of the anti-glare layer is 65%, the root mean square slope RΔq is not less than 0.15, and a thickness L measured in millimeters (mm) from a bottom of the upper substrate of the display module to a top of the anti-glare layer complies with the following relational expression:

$$L > \frac{0.001 * PPI}{R\Delta q}.$$

11. A display panel comprising:
- a display module, the display module having a pixel density PPI, and the display module comprising:
  - a substrate; and
  - a plurality of light-emitting components on the substrate; and
- an anti-glare layer over the display module, a top surface of the anti-glare layer having a plurality of microstructures, and the microstructures having a root mean square slope RΔq, wherein when a surface haze of the anti-glare layer is 35%, the root mean square slope RΔq is greater than 0.07 and less than 0.1, and a thickness L measured in millimeters (mm) from tops of the light-emitting components of the display module to a top of the anti-glare layer complies with the following relational expression:

$$L > \frac{0.001 * PPI}{Rdq}.$$

12. The display panel of claim 11, wherein the anti-glare layer comprises a single material.

13. The display panel of claim 11, wherein the anti-glare layer has an internal haze of zero.

14. The display panel of claim 11, wherein a surface haze of the anti-glare layer is greater than an internal haze of the anti-glare layer.

15. The display panel of claim 11, wherein the display module further comprises:
- an encapsulation layer over the light-emitting components and contacting the light-emitting components.

16. The display panel of claim 15, wherein the display module further comprises:
- an adhesive layer over the encapsulation layer and under the anti-glare layer.

* * * * *